(12) United States Patent
Romero et al.

(10) Patent No.: US 12,514,364 B2
(45) Date of Patent: Jan. 6, 2026

(54) MODULAR CANTILEVER ARMS FOR MODULAR CANTILEVER RACK SYSTEMS

(71) Applicant: ROLL OUT RACKS PRODUCTS, Brossard (CA)

(72) Inventors: Daniel Romero, St-Jean-sur-Richelieu (CA); Louis Paquette, St-Jean-sur-Richelieu (CA); Mathieu Gauthier, Saint-Narcisse (CA)

(73) Assignee: ROLL OUT RACKS PRODUCTS, Brossard (CA)

( * ) Notice: Subject to any disclaimer, the term of this patent is extended or adjusted under 35 U.S.C. 154(b) by 225 days.

(21) Appl. No.: 18/277,892

(22) PCT Filed: Feb. 24, 2022

(86) PCT No.: PCT/CA2022/050268
§ 371 (c)(1),
(2) Date: Aug. 18, 2023

(87) PCT Pub. No.: WO2022/178639
PCT Pub. Date: Sep. 1, 2022

(65) Prior Publication Data
US 2024/0306813 A1    Sep. 19, 2024

Related U.S. Application Data

(60) Provisional application No. 63/152,971, filed on Feb. 24, 2021.

(51) Int. Cl.
*A47B 45/00*     (2006.01)
*A47B 47/02*     (2006.01)
(Continued)

(52) U.S. Cl.
CPC .......... *A47B 45/00* (2013.01); *A47B 47/027* (2013.01); *A47B 96/025* (2013.01); *A47B 47/021* (2013.01); *A47B 96/061* (2013.01); *A47B 96/14* (2013.01)

(58) Field of Classification Search
CPC ....... A47B 45/00; A47B 47/027; A47B 47/00; A47B 47/0041; A47B 47/021;
(Continued)

(56) References Cited

U.S. PATENT DOCUMENTS 584,093 A * 6/1897 Maytham ............. A47B 57/565
248/245
1,702,937 A * 2/1929 Friedemann ............. A47F 3/12
248/242
(Continued)

FOREIGN PATENT DOCUMENTS

DE       17 81 008 B1    5/1972
EP        1449794 A1 *   8/2004 ............. B65G 1/026
(Continued)

OTHER PUBLICATIONS

Extended European Search Report dated Nov. 18, 2024 for corresponding EP application No. 22758671.6.
(Continued)

*Primary Examiner* — Devin K Barnett
(74) *Attorney, Agent, or Firm* — Damien Calvet; Gowling WLG (Canada) LLP

(57) ABSTRACT

A rollout cantilever arm for a modular cantilever rack system comprising a fixed horizontal member comprising two oppositely-facing fixed parallel load bearing surfaces, a roller mechanism and one or more interconnecting elements; and a mobile horizontal member partially encased in the fixed horizontal member. The fixed horizontal member comprises a roller-end engaged between the two load bearing
(Continued)

surfaces and a load bearing surface supported by the roller mechanism. The interconnecting elements of the fixed horizontal member are configured for interconnecting two supporting vertical members of the modular cantilever rack system. The load-bearing surfaces extend perpendicularly between the two vertical members and the roller mechanism being located at an end distant from the two vertical members.

11 Claims, 20 Drawing Sheets

(51) Int. Cl.
  *A47B 96/02* (2006.01)
  *A47B 96/06* (2006.01)
  *A47B 96/14* (2006.01)
(58) Field of Classification Search
  CPC ..... A47B 47/022; A47B 47/028; A47B 96/02; A47B 96/025; A47B 96/027; A47B 96/06; A47B 96/061; A47B 96/14; A47B 57/06; A47B 57/08; A47B 57/10; A47B 57/16; A47B 57/30; A47B 57/32; A47B 57/34; A47B 57/40
  See application file for complete search history.

(56) References Cited

U.S. PATENT DOCUMENTS

| | | | | |
|---|---|---|---|---|
| 2,020,991 A * | 11/1935 | Brody | A47B 61/003 | 24/372 |
| 2,335,030 A * | 11/1943 | Rotheraine | A47B 61/003 | 211/85.3 |
| 2,966,228 A * | 12/1960 | Kowalski | E04G 3/22 | 182/229 |
| 3,152,670 A * | 10/1964 | Colligan | A47B 57/402 | 211/187 |
| 3,228,532 A * | 1/1966 | Sisk | H05K 7/18 | 211/1 |
| 3,335,872 A * | 8/1967 | Dodich | A47G 25/746 | 211/85.3 |
| 3,794,183 A * | 2/1974 | Colbridge | A47B 46/00 | 211/208 |
| 3,954,182 A * | 5/1976 | McEvers | A47G 25/746 | 211/94.01 |
| 4,109,794 A * | 8/1978 | Samuel | A47G 25/746 | 211/100 |
| 4,212,402 A * | 7/1980 | Kelly | A47F 7/24 | 211/105.3 |
| D277,436 S * | 2/1985 | Benedict | D6/315 | |
| 4,589,349 A * | 5/1986 | Gebhardt | A47B 96/025 | 108/62 |
| 4,602,570 A * | 7/1986 | Lee | A47B 96/025 | 108/143 |
| 4,735,470 A * | 4/1988 | Falk | F25D 25/021 | 312/246 |
| 4,760,930 A * | 8/1988 | Fox | A47B 96/07 | 248/250 |
| 4,771,899 A * | 9/1988 | Benedict | A47B 61/02 | 211/94.01 |
| 4,776,472 A * | 10/1988 | Rosen | A47B 96/025 | 211/175 |
| D321,094 S * | 10/1991 | Greenhut | D6/324 | |
| D334,291 S * | 3/1993 | Rooke | D6/315 | |
| 5,531,159 A * | 7/1996 | Stubblefield | A47F 5/0093 | 248/242 |
| 5,660,286 A * | 8/1997 | Shea | A47F 5/083 | 211/189 |
| 5,720,230 A * | 2/1998 | Mansfield | A47F 5/0043 | 211/DIG. 1 |
| 5,799,588 A * | 9/1998 | Engel | A47B 57/06 | 108/143 |
| 5,803,273 A * | 9/1998 | Menaged | A47F 5/0823 | 211/105.3 |
| D409,847 S * | 5/1999 | Augspurger | D6/315 | |
| 5,970,887 A * | 10/1999 | Hardy | A47B 46/00 | 211/187 |
| 6,070,747 A * | 6/2000 | Shea | A47F 5/0807 | 248/220.31 |
| 6,497,185 B1 * | 12/2002 | Barrett | A47B 96/025 | 108/143 |
| 6,799,523 B1 * | 10/2004 | Cunha | A47F 5/0093 | 108/143 |
| 6,976,595 B1 * | 12/2005 | Geller | A47F 5/0838 | 211/124 |
| 7,086,544 B1 * | 8/2006 | Doench | A47B 96/028 | 248/222.51 |
| 7,311,211 B2 * | 12/2007 | Chung | A47F 5/0093 | 211/90.02 |
| 7,490,424 B2 * | 2/2009 | Caterinacci | G09F 7/20 | 40/606.14 |
| 8,646,624 B2 * | 2/2014 | Fernandez | A47B 57/42 | 211/90.03 |
| 8,708,026 B2 * | 4/2014 | Graves | A47H 5/0325 | 160/330 |
| 8,926,034 B2 * | 1/2015 | Park | A47B 96/025 | 108/108 |
| 9,022,237 B2 * | 5/2015 | Hall | A47B 81/04 | 211/162 |
| 10,334,967 B2 * | 7/2019 | Mercier | A47F 5/0093 | |
| 10,912,398 B2 * | 2/2021 | Wills | A47B 57/585 | |
| 11,751,683 B1 * | 9/2023 | Cheng | A47B 96/1441 | 211/123 |
| 2003/0071001 A1 * | 4/2003 | Goldberg | A47G 25/0692 | 211/105.3 |
| 2004/0090158 A1 * | 5/2004 | Horowitz | A47B 88/467 | 312/319.4 |
| 2011/0147323 A1 * | 6/2011 | Sainato | A47F 1/12 | 40/642.02 |
| 2014/0091696 A1 * | 4/2014 | Welker | A47F 5/101 | 211/153 |
| 2015/0021450 A1 * | 1/2015 | Muhlfelder | A47F 5/0068 | 248/316.5 |
| 2015/0230628 A1 * | 8/2015 | Juric | A47F 5/005 | 211/59.4 |
| 2023/0107613 A1 * | 4/2023 | Mikes | A47B 61/02 | 211/85.3 |

FOREIGN PATENT DOCUMENTS

| | | | | |
|---|---|---|---|---|
| EP | 1449794 B1 * | 5/2006 | | B65G 1/026 |
| JP | S59 142211 U | 9/1984 | | |
| JP | 2019-104557 A | 6/2019 | | |

OTHER PUBLICATIONS

International Search Report of corresponding PCT/CA2022/050268 dated May 16, 2022.

* cited by examiner

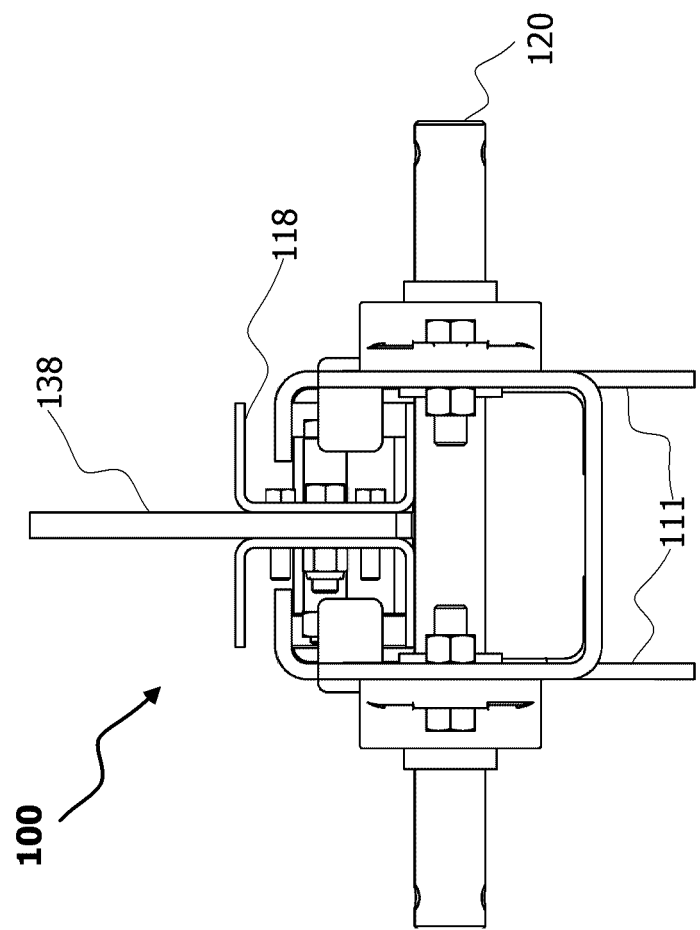

MODULAR CANTILEVER ARMS FOR MODULAR CANTILEVER RACK SYSTEMS

CROSS-REFERENCE TO RELATED APPLICATIONS

The present non-provisional patent application is a U.S. National Phase of International Patent Application PCT/CA2022/050268 filed Feb. 24, 2022 which is hereby incorporated by reference in its entirety and which claims the benefits of priority of U.S. Provisional Patent Application No. 63/152,971 entitled "MODULAR CANTILEVER ARMS FOR MODULAR CANTILEVER RACK SYSTEMS", and filed at the United States Patent and Trademark Office on Feb. 24, 2021, the content of which is incorporated herein by reference.

TECHNICAL FIELD

The present invention generally relates to storage systems.

BACKGROUND

An important challenge for warehouse operators is the storage of long, awkwardly-shaped inventory, which is regularly stored on the floor and occupy valuable space. Cantilever racks are often used as a solution to free up valuable floor space, organize the inventory and facilitate its access. Furthermore, cantilever racks provide storage flexibility as the structures are self-supporting and do not require overhead or aisle support members.

Cantilever racks typically comprise a series of upright columns supported by a base which is typically secured to a ground surface. The cantilever arms are welded to the upright columns and appropriate bracing such as steel beams are added to the structure in accordance with the desired load capacity of the arms, columns and overall structure. Typically, someone considering the purchase of a cantilever rack would have to consider a series of parameters to be adjusted to their needs. The material to be stored, or useful load, is first evaluated by the customer and will dictate the quantity, spacing, length and load capacity of the cantilever arms to be secured to the vertical columns. Similarly, the height of the vertical columns and appropriate bracing are determined according to the storage needs at the time of purchase. Since most, if not all, of the components are welded to one another, a user cannot adjust or reconfigure the rack as their storage needs evolve.

The present invention aims at improving the adjustment and reconfigurability of a cantilever system after its initial installation.

SUMMARY OF THE INVENTION

The shortcomings of the prior art are generally mitigated by rollout cantilever arms for modular cantilever rack systems.

The following presents a simplified summary of some aspects or embodiments of the invention in order to provide a basic understanding of the invention. This summary is not an extensive overview of the invention. It is not intended to identify key or critical elements of the invention or to delineate the scope of the invention. Its sole purpose is to present some embodiments of the invention in a simplified form as a prelude to the more detailed description that is presented later.

The present specification discloses a rollout cantilever arm for a modular cantilever rack system that includes a fixed horizontal member comprising two oppositely-facing fixed parallel load bearing surfaces, a roller mechanism and one or more interconnecting elements. The rollout cantilever arm also includes a mobile horizontal member partially encased in the fixed horizontal member comprising a roller-end engaged between the two load bearing surfaces and a load bearing surface supported by the roller mechanism. The interconnecting elements of the fixed horizontal member are configured for interconnecting two supporting vertical members of the modular cantilever rack system. The load-bearing surfaces extend perpendicularly between the two vertical members and the roller mechanism is located at an end distant from the two vertical members. The rollout cantilever arm further comprises material stoppers or any other suitable accessories well know in the art for retaining long material on the rollout cantilever arm.

The present specification also discloses a modular cantilever rack system comprising at least a pair of pre-holed supporting vertical members, and at least a pair of rollout cantilever arms as described above. The modular cantilever rack system further comprises a plurality of fasteners for securing respective ones of the pair of rollout cantilever arms to respective ones of the pair of supporting vertical members, which defines a first mobile storage surface along a horizontal storage plane.

In one embodiment, the modular cantilever rack system comprises at least an opposite pair of rollout cantilever arms secured with the pair of rollout cantilever arms to the respective ones of the pair of supporting vertical members, which defines a second mobile storage surface along the horizontal storage plane.

In one embodiment, the modular cantilever rack system comprises base members secured to the vertical members for supporting the vertical members into ground.

In one embodiment, the modular cantilever rack system comprises anchors for securing the vertical members into ground.

In one embodiment, the modular cantilever rack system for storing long material such as metal tubing, bar stock, pipes and extrusions along the storage plane.

In one embodiment, the modular cantilever rack system comprises at least one bracing member secured to the support columns for stabilizing the support columns.

The present specification also discloses a method of assembling a modular cantilever rack system that entails providing at least two supporting vertical members, at least two rollout cantilever arms and a plurality of fasteners. The method then entails securing the at least two supporting vertical members to ground, and securing the fixed horizontal member to the at least two supporting vertical members and the mobile horizontal member using the one or more interconnecting elements and the plurality of fasteners.

Other and further aspects and advantages of the present invention will be better understood upon the reading of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other aspects, features and advantages of the invention will become more readily apparent from the following description, reference being made to the accompanying drawings in which:

FIG. 1A-C is perspective side view, front view and side view, respectively, of the rollout cantilever arm according to a preferred embodiment.

DETAILED DESCRIPTION

Figure 1A:
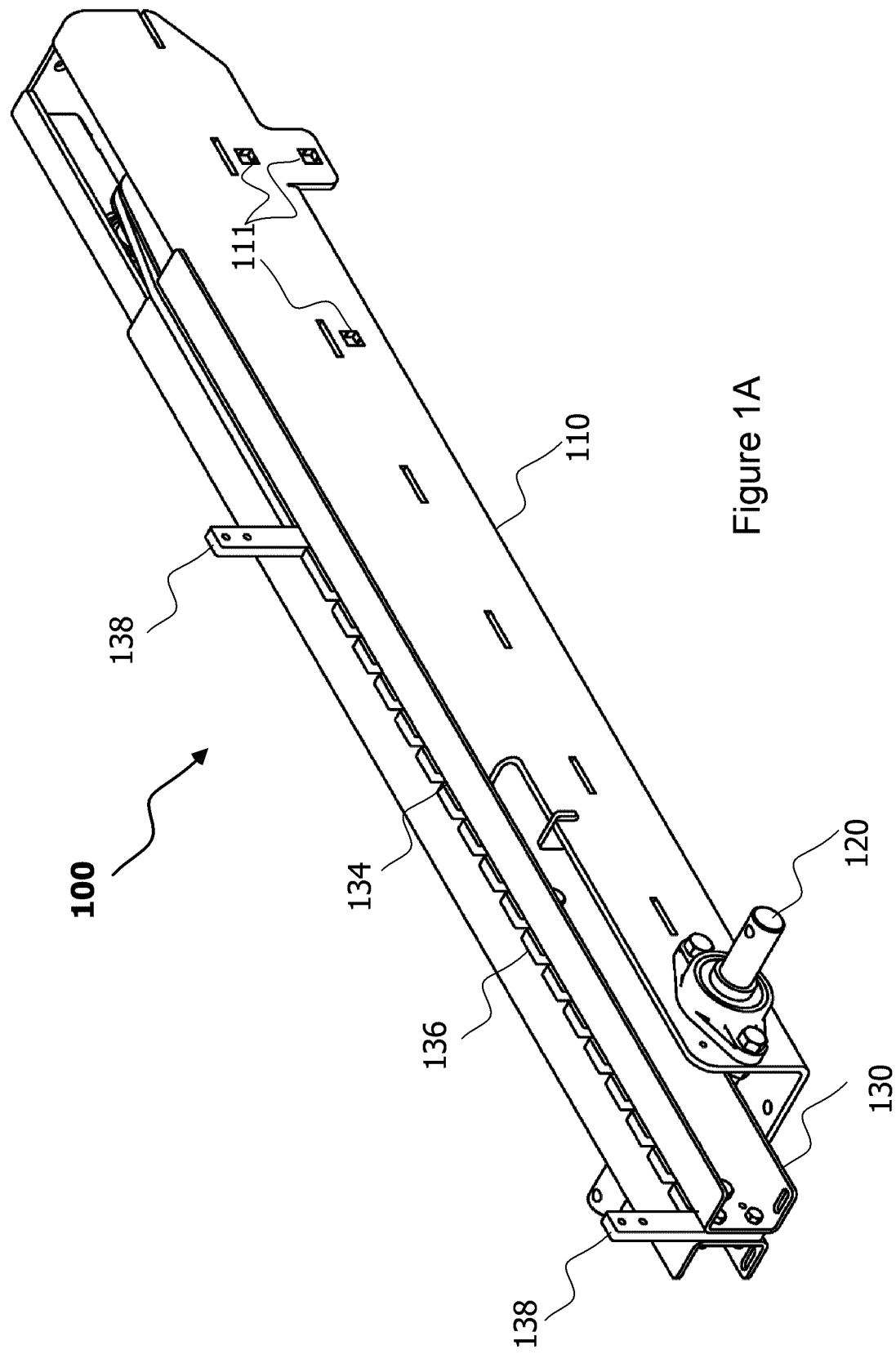

A novel rollout cantilever arm for a modular cantilever rack system will be described hereinafter. Although the invention is described in terms of specific illustrative embodiments, it is to be understood that the embodiments described herein are by way of example only and that the scope of the invention is not intended to be limited thereby.

The reality of a warehouse operator is constantly evolving as new products are being developed and old ones are being discontinued. The agility of the storage capacities of a company need to match the overall agility of the company to adapt to new customer needs. The inventors have identified a need for a storage system capable of evolving alongside the storage needs of a warehouse. A modular storage system capable of reconfiguration as storage needs evolve would thus be highly desirable.

Cantilever racks typically use non-standard parts and are thus expensive to manufacture and difficult to assemble and disassemble. Moreover, many parts are typically welded to one another, which cannot be adjusted or reconfigured as storage needs evolve. The partially assembled racks are also expensive to ship as they require large container space, which can be even more expensive when shipping to remote areas. Shipping cantilever racks across large areas, such as Canada and the United States of America, is therefore an important challenge.

Since many conventional cantilever racks can only receive material on one side, storage is not always optimized according to the warehouse's capabilities. Furthermore, as cantilever arms elevations are determined once at the time of initial installation, precious rack space is often left unused. In addition to proper vertical spacing between the arms, adequate access to the material need to be considered. Thus, in order for the material to be accessible the cantilever arms need to be extended further than the distance required for storage only. As such, storage density is regularly compromised for the sake of accessibility and vice-versa. Thus, large floor space is occupied by oversized aisles to accommodate the picking and stocking of materials.

There is thus a need for a versatile cantilever rack capable of storing a wide variety of materials in an efficient manner. Reducing shipping costs and simplifying assembly and disassembly in order to facilitate the reconfiguration of the system as storage needs evolve would also be highly desirable. Moreover, facilitating access of stored materials without compromising storage density would help address most warehouse operators' daily struggle.

A rollout cantilever arm for a modular cantilever rack system will be described herein. A modular cantilever rack system comprising a rollout cantilever arm and a method of assembling a rollout cantilever system will also be described.

The modular cantilever rack system's flexibility through its assembly design (e.g., bolted), allows a warehouse operator to reconfigure the system as business needs evolve. The system's modularity allows the operator to easily move or modify the system by adding or removing the modular components. The system can be switched between a single-sided rack and a double-sided rack. New levels can be added to accommodate more items and levels can be removed to free space for larger items between each level. The systems assembly design (e.g., bolted construction) also gives the owner the flexibility to easily repair or replace damaged parts. The modular construction provides the flexibility to configure and reconfigure the system according to the warehouse's specific needs. Of course, capacity of the system need to be carefully considered for the systems assembly design (e.g., bolted construction).

Other and further aspects and advantages of the present invention will be better understood upon the reading of the illustrative embodiments about to be described and/or consideration of the appended claims, and various advantages not referred to herein will occur to one skilled in the art upon employment of the invention in practice. As used herein, "useful load" refers to the load defined by the weight of the material supported by the cantilever arms, which are in turn supported by vertical members of the modular cantilever rack system. The term "load" as used herein refers to the total load supported by the modular cantilever rack system, which includes the useful load (i.e., load of stored material) and the load defined by the weight of the modular cantilever rack system itself. The term "load capacity" or "cantilever arm capacity" as used herein refers to the maximum load that can be supported by the cantilever arm, which includes material stored on the cantilever arm.

Figure 1C:
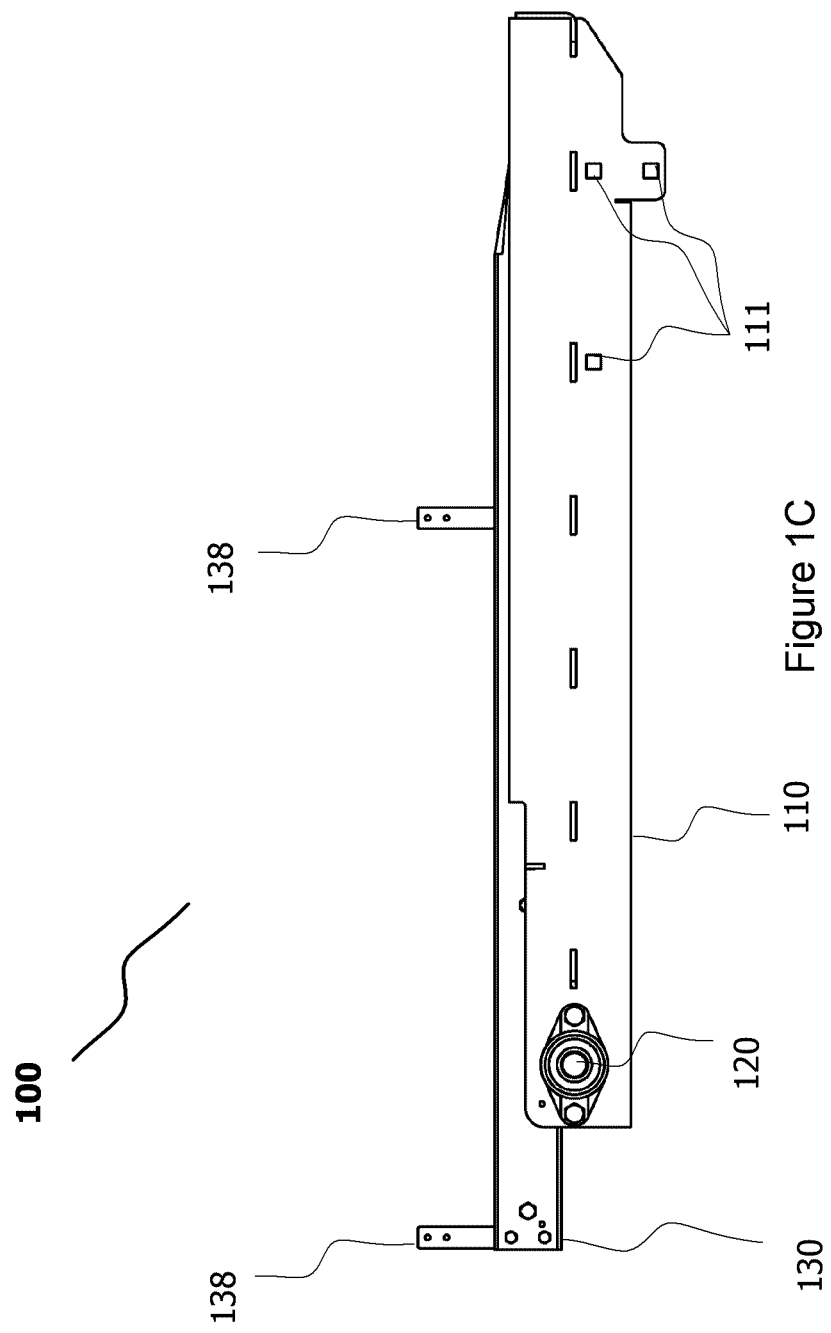
Figure 2A:
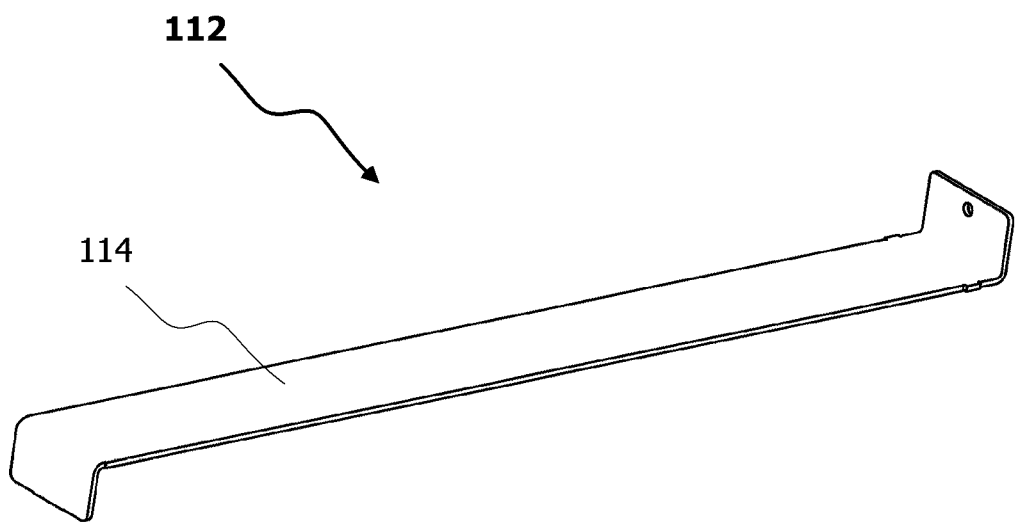
FIG. 2A-C is perspective side view, front view and side view, respectively, of the fixed horizontal member, according to a preferred embodiment.
Figure 2B:
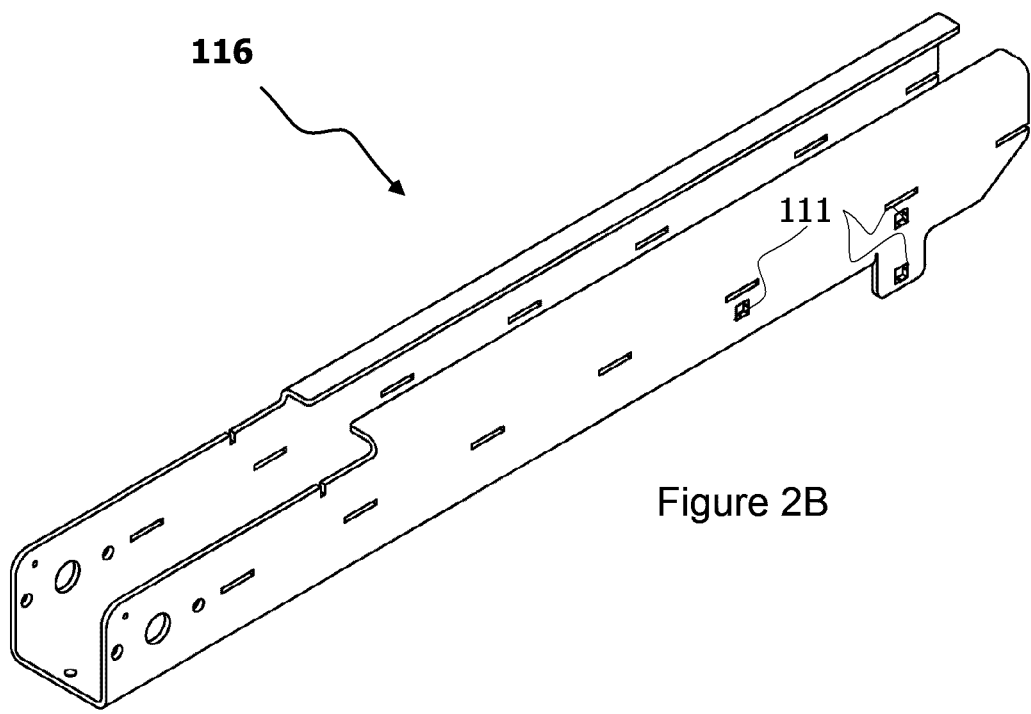
Figure 2C:
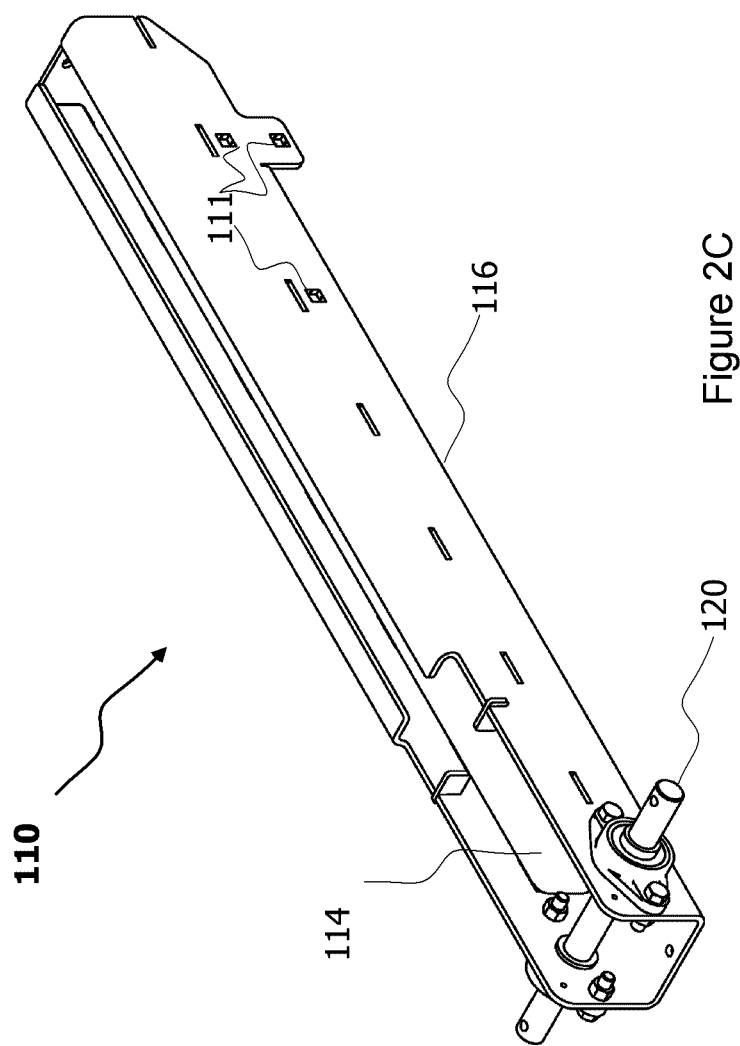
Figure 3A:
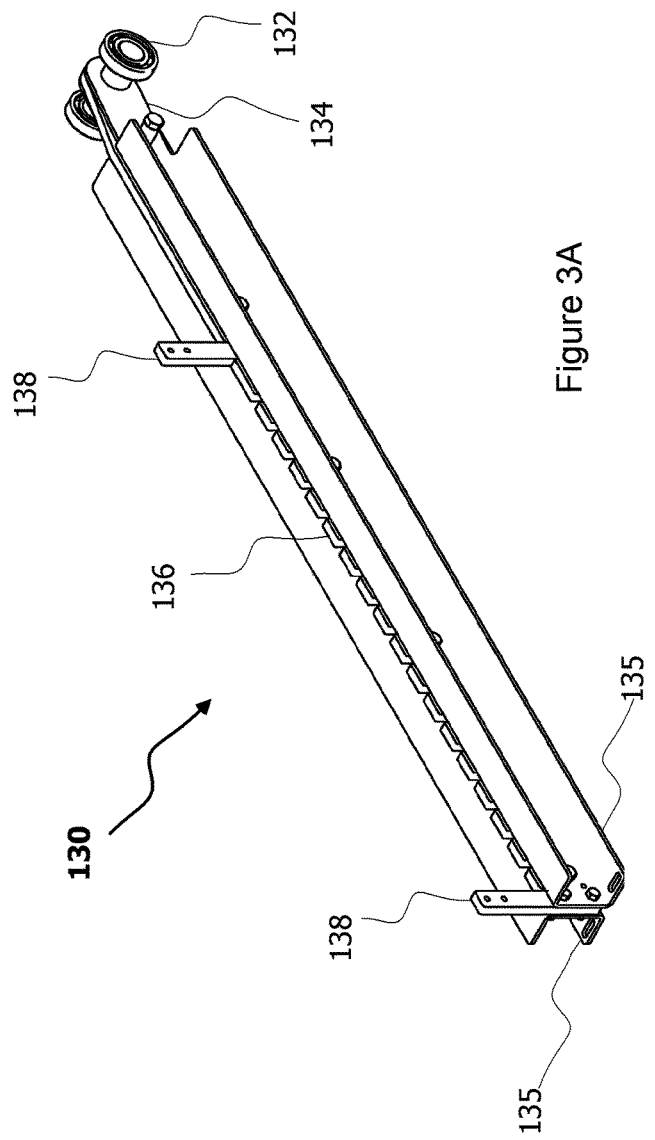
FIG. 3A-C is a perspective side view, front view and side view, respectively, of the mobile horizontal member, according to a preferred embodiment.
Figure 3B:
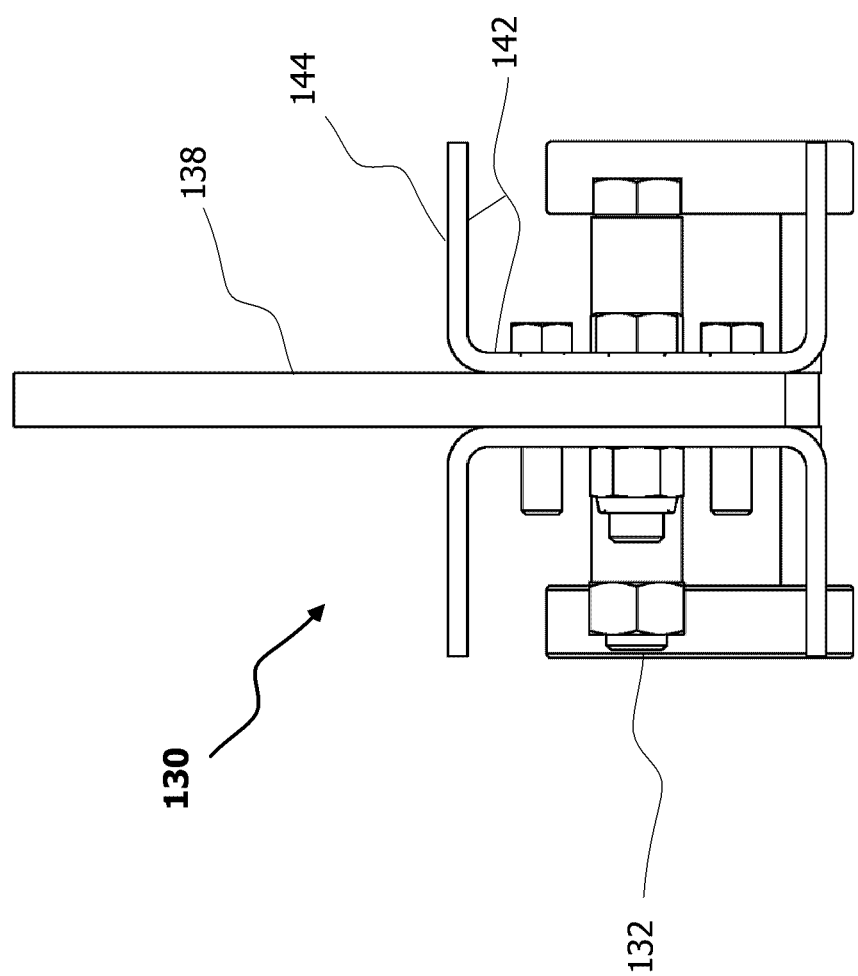
Figure 3C:
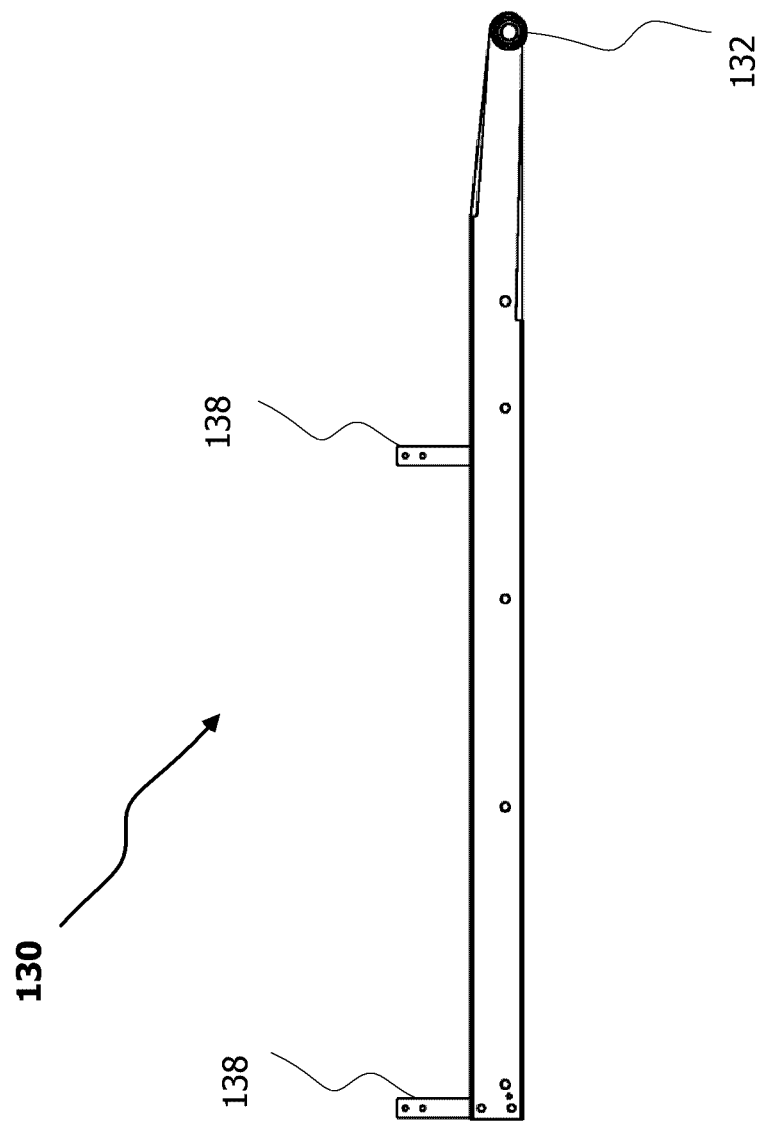

According to a preferred embodiment depicted in FIGS. 1-3, a rollout cantilever arm 100 comprises a fixed horizontal member 110 and a mobile horizontal member 130. In an exemplary embodiment, the fixed horizontal member 110 is assembled using a first flat member 112 which serves as a lower load-bearing surface 114 and an encapsulating member 116 which provides an opposing upper load-bearing surface 118. The two oppositely facing fixed parallel load-bearing surfaces 114, 118, when secured onto a cantilever rack, extend perpendicularly between two vertical members 150. The shape and size of the encapsulating member 116 may be adapted as needed to provide different variations of the load-bearing surfaces. For example, an encapsulating member having a "W" shape comprising a lower load-bearing surface and an upper load-bearing surface may be be provided in one component rather than two separate components as illustrated herein. Other variations exist and may be put into practice while remaining within the reach of the skilled person. The fixed horizontal member 110 comprises a roller mechanism 120 located at an end distant from two pre-holed vertical members 150. The two vertical members 150 are interconnected by one or more interconnecting elements 111 bolted or otherwise releasably secured into both of the two vertical members 150. Various interconnecting elements may be considered by a person of ordinary skill in the art depending on specific characteristics of the interconnecting elements as well as the components to be interconnected, considering a desired load capacity of the rollout cantilever arms. For instance, the interconnecting elements 111 may comprise symmetrical structural features of the encapsulating member 116, e.g., for receiving bolts. When assembled, the bolts and the interconnecting elements 111 ensure structural stability of the rollout cantilever arm 100 with the two vertical members 150. In some embodiments, the interconnecting elements 111 comprise one or more additional interconnecting plate bolted or otherwise releasably secured above and/or under the rollout cantilever arm 100, between the two vertical members 150. In some embodiments, the additional interconnecting plate may also be bolted or releasably secured to the rollout cantilever arm 100. The interconnecting elements and the two vertical members 150 are configured to allow a plurality of configurations therebetween as well as switching between the different configurations in a non-destructive manner. For instance, the pre-holed pattern on the two vertical members 150 is compatible with and provides different options of bolting patterns for the interconnecting elements 111. Additional interconnecting members may also be provided. For instance, the interconnecting elements may comprise one or more fixed arms at a top of the two vertical members 150 and one or more base plates with pre-assigned positions for the two vertical members 150 at the base thereof. Characteristics to be considered are well known in the art and include the dimension, location and load capacity of the interconnecting elements in addition to the manufacturer's specification for a given part. In order to ease assembly, future reconfiguration or the replacement of damaged parts, the components are preferably bolted rather than welded, although some components may be welded without deviating from the teachings presented herein. Furthermore, the various bolted components are preferably fixed using at least Grade 5 carriage bolts and nylon lock nuts.

The roller mechanism 120 allows the rollout cantilever arm to be mechanically roll out in an extended position to facilitate access to the stored material. Since the rollout cantilever arms 100 can be extended and retracted as needed, the large floor space normally occupied by oversized aisles can be reduced to a minimum, thereby saving precious floor space. The roller mechanism 120 also functions as a third load-bearing surface and a pivot point from one load-bearing surface 114 or 118 to another 118 or 114.

The mobile horizontal member 130 included in the rollout cantilever arm 100 can extend to facilitate material access and retract when not in use to maximize storage density. The mobile horizontal member 130 as exemplified in FIGS. 1 and 3 comprises two C-beam members 135 interconnected by a central member 134 comprising a plurality of prongs 136. Other variations of the mobile horizontal member may be used while remaining within the teachings found herein. For example, a single H-beam having an integrated central member may be used without deviating from the teachings. Other variations of the mobile horizontal member may be considered by a person skilled in the art such as two I-beams interconnected by a central member. Of course, it is to be understood that other variations exist and may be put into practice while remaining within the teachings found herein. The prongs 136 may be used as anchors for material stoppers (not shown) which can be installed along the surface of the central member 134 in addition to two material stoppers 138 defining the surface in contact with the material. As such, a plurality of material stoppers can be installed to accommodate materials of different shapes and sizes to optimize storage efficiency. As can be seen in FIG. 1, the mobile horizontal member 130 is partially encased in the encapsulating member 116 of the fixed horizontal member 110. In the retracted, or neutral, position depicted in FIG. 1A, only a small portion, or tip, of the mobile section extends past the fixed section. The bottom 140 and side surfaces 142 of the mobile horizontal member 130 are fully encapsulated whereas the top surface 144 is only partially encapsulated as the encapsulation of the top surface by the encapsulating member 116 provides the upper load-bearing surface 118. As extension of the mobile horizontal member 130 is initiated, the encapsulated portion starts to protrude from the encapsulating member 116 to a distance limited by an end stop located on the fixed horizontal member 110 at a distance determined by calculating the load capacity of the rollout cantilever arms and vertical members.

The mobile horizontal member 130 further comprises a roller-end 132 engaged between the two oppositely facing fixed parallel load-bearing surfaces 114, 118. The roller-end 132 is provided with the central member 134 at a distance proximal to the vertical members 150. The lower load-bearing surface 114 supports the load when the rollout cantilever arm is in the retracted position, exemplified in FIG. 1A, whereas the second load-bearing surface 118 supports the load when the rollout cantilever arm is in the extended position, exemplified in FIG. 2E. The useful load is thus supported by either the lower 114 or the upper 118 load-bearing surface, depending on the weight of the load and the distance of the rollout cantilever arm 100 when extended from the roller mechanism 120. The mobile section pivots on the roller mechanism 120 from being supported by the first load-bearing surface 114 to being supported by the second load-bearing surface 118 when the rollout cantilever arm 100 is being extended. The third load-bearing surface on the roller mechanism 120 assists either the first 114 or the second 118 load-bearing surface, depending on the extended distance and weight thereon from the rollout cantilever arm 100 when loaded.

Other embodiments of the cantilever arm 100 provide different configurations of load-bearing surfaces. For example, other configurations of the fixed horizontal member 110 may be considered by a person skilled in the art while remaining within the teachings found herein. For example, the flat member and encapsulating member may be welded together into a single component and remain within the scope of the present invention. Cantilever arms may be typically available in five depths (e.g., between 24 and 48 inches), but may also be customized to meet customer needs.

Figure 4A:
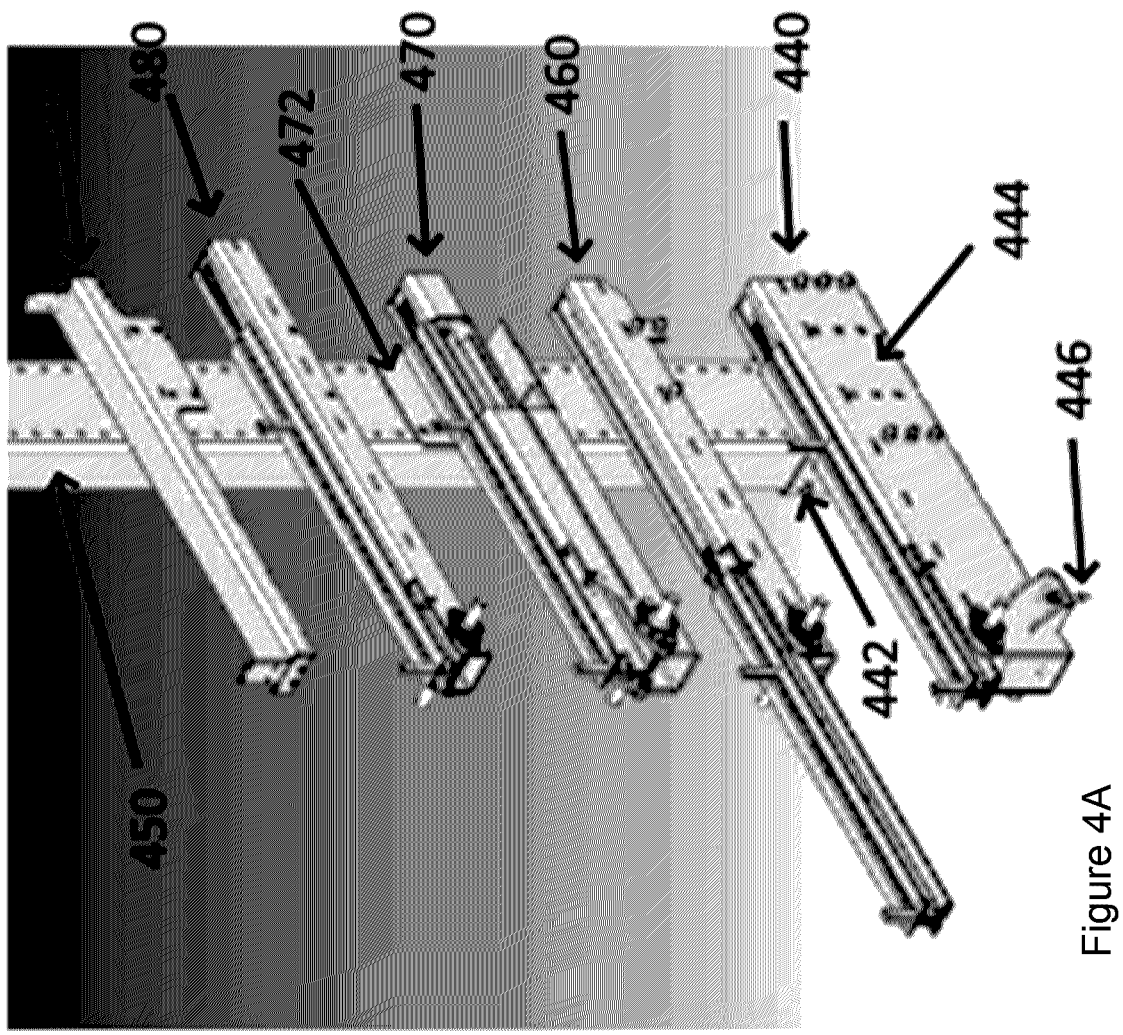
FIG. 4A-C is perspective side view, side view and front view, respectively, of the different rollout cantilever arms with different load capacity, according to a preferred embodiment.
Figure 4B:
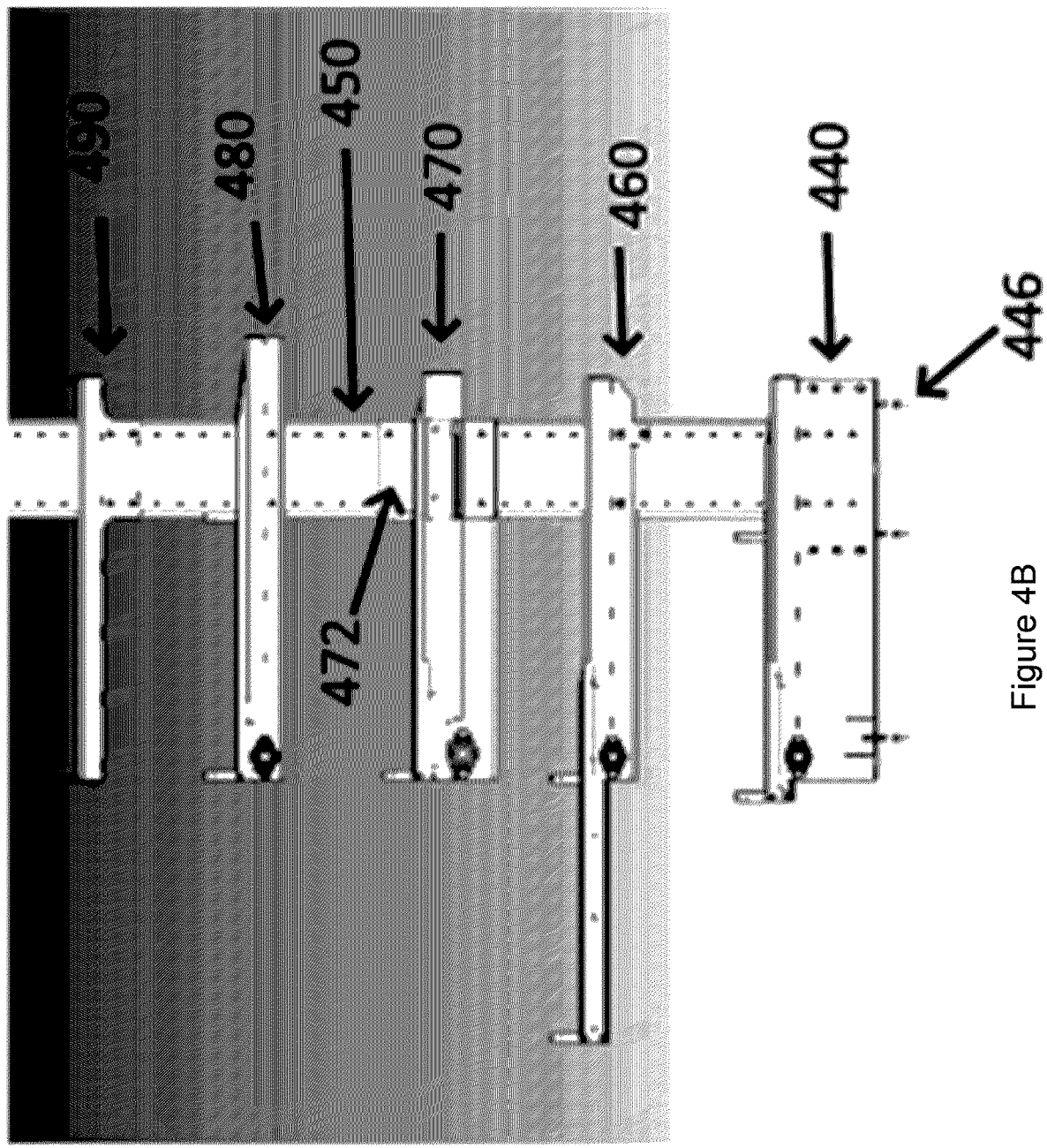
Figure 4C:
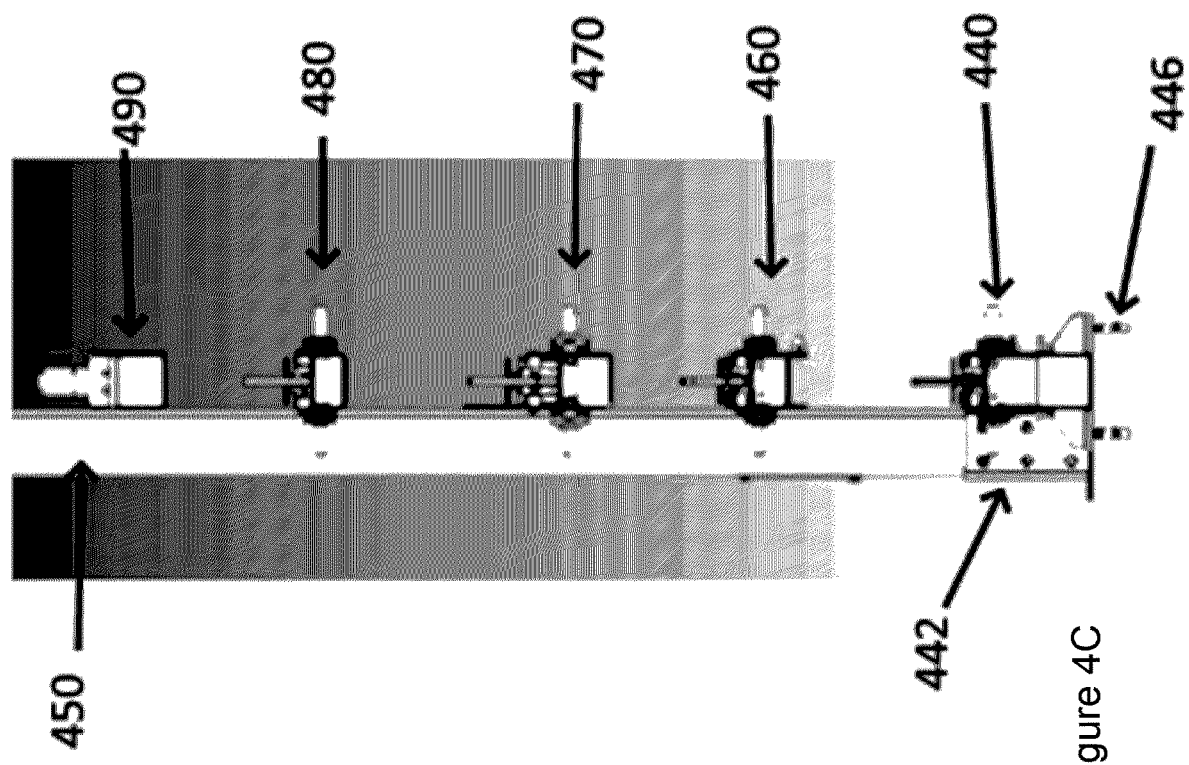

According to a preferred embodiment, different configurations of the cantilever arm 100 are provided with different load capacities depending on the storage needs in accordance with the modularity of the system. Variations of the interconnecting elements and configuration of the cantilever arms 100 as well as the number of fasteners securing the cantilever arm onto the vertical member 150 will influence the capacity of a cantilever arm 100. As a person of ordinary skill in the art would readily acknowledge, providing additional fasteners and/or interconnecting elements to support the cantilever arm 100 onto the vertical members 150 will increase its load capacity. Furthermore, lower cantilever arms will generally have higher load capacities than cantilever arms secured higher on the vertical members as they are further from the system's center of gravity. Similarly, static cantilever arms generally have higher load capacities than rollout cantilever arms since they cannot be extended away from the system's center of gravity. By way of example, five different configurations of arms, each having a different load capacity, are depicted in the exemplary embodiment of FIG. 4 wherein only one vertical member 450 is shown to illustrate the different connecting elements for each cantilever arm while a second vertical member (not shown) would be required in an actual system. A first exemplary lower rollout cantilever arm 440 is secured to a base 442 which is anchored to the ground using, for example, a plurality of concrete anchors 446. The base 442 functions as an interconnecting element by securing the fixed horizontal member 444 to the vertical member 450 using a plurality of fasteners. Since this rollout cantilever arm 440 will help support the overall structure of a rollout cantilever rack, a larger number of high-grade fasteners (e.g., #5 bolt) is used. Thus, the higher number of fasteners together with the ground directly supporting the fixed horizontal member 444 all contribute to the higher load capacity this rollout cantilever arm 440. For instance, the exemplary rollout cantilever arm 440 secured to the base 442 would be expected to reach a load capacity of up to 7,000 lbs. Next up is the rollout cantilever arm 460, which could have a load capacity of up to 3,500 lbs. This exemplary rollout cantilever arm 460 is secured to the vertical member 450 using three fasteners. To illustrate the importance of the various interconnecting elements, the load capacity of the next rollout cantilever arm 470 may be doubled (i.e., up to 7,000 lbs) by using a plurality of interconnecting plates 472 to secure the rollout cantilever arm 470 to the vertical member 450 and a diagonal bracing member (not shown). The interconnecting plates 472 represent an example of interconnecting element. Being supported by only two fasteners, the rollout cantilever arm 480 located at the highest level has the lowest weight capacity which may range up to 1,700 lbs. Finally, the exemplary static cantilever arm 490 may have a load capacity of up to 3,500 as four fasteners are used and since it cannot be extended. Although five arms are illustrated, other variations of static and rollout cantilever arms may be assembled using other interconnecting elements.

Figure 5:
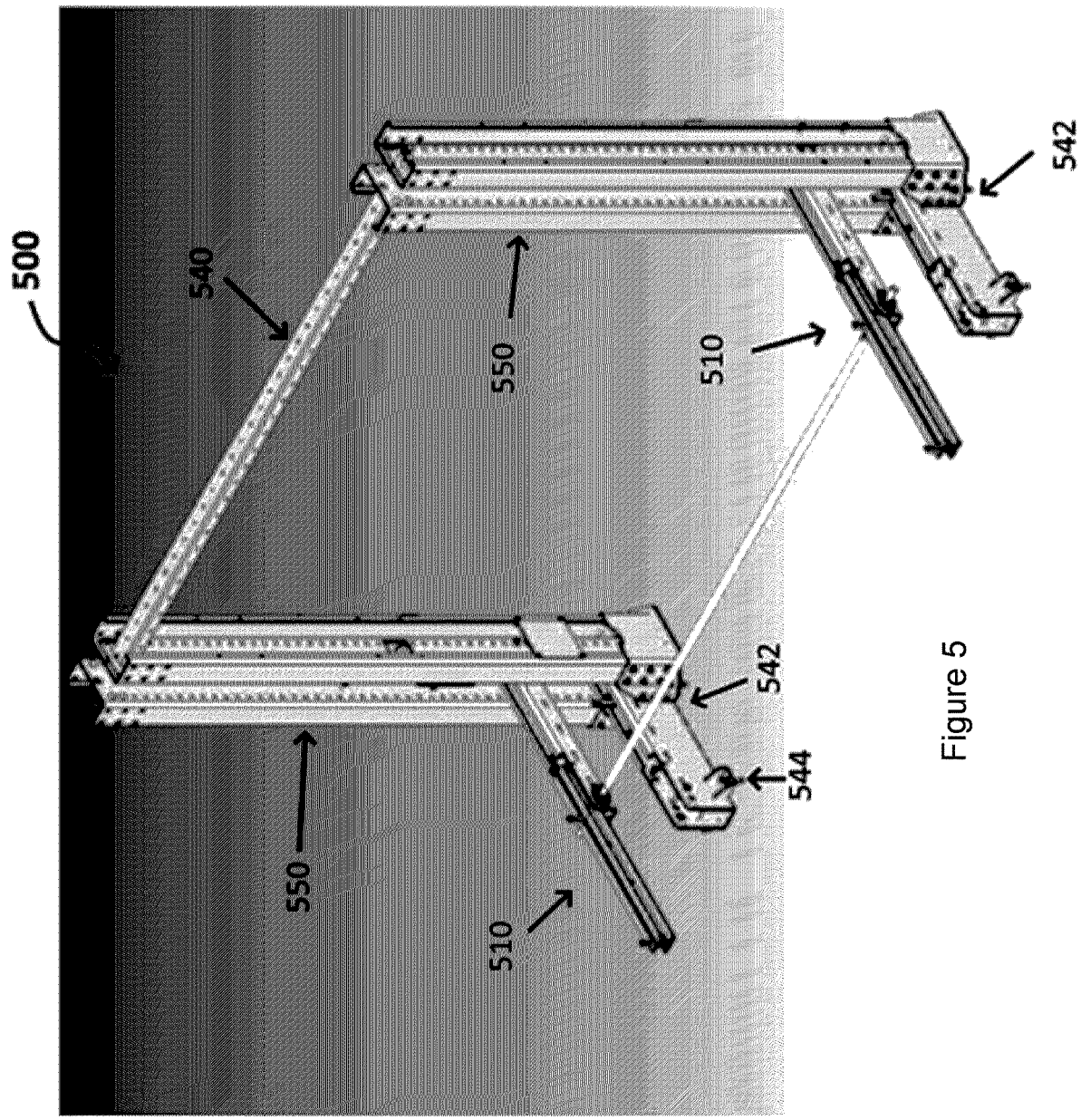
FIG. 5 is a perspective side view of the modular cantilever rack system comprising the minimal required components, according to a preferred embodiment.

An exemplary modular cantilever rack system 500 is depicted with particular reference to FIG. 5 and comprises a pair of rollout cantilever arms 510. Each of the rollout cantilever arms 510 would have characteristics discussed with reference to the rollout cantilever arm 100. The modular cantilever rack system 500 comprises at least a pair of pre-holed supporting vertical members 550 and a plurality of fasteners for securing respective cantilever arms 510 to respective vertical members 550. A plurality of interconnecting elements is also provided according to storage needs. The pair of rollout cantilever arms 510 secured to respective vertical members 550 defines a first mobile storage surface along a horizontal storage plane. Also included is a horizontal bracing/support member 540 interconnecting the pair of vertical members 550 for structural support of the modular cantilever rack system 500. A pair of base members 542 secured to the pair of vertical members 550 are also provided for supporting the vertical members into ground 550. The skilled person in the art may decide to use other variations of base members, for example, a vertical member having an integrated base member into one component instead of being separate components. Similarly, other means of securing to ground may be used, for example, anchoring flanges or disks. In order to secure the vertical members 550 into ground, the system 500 includes a plurality of anchors 544 inserted into the ground via the base members 542.

A modular cantilever rack system 500 as described herein may be configured for storing long material such as metal tubing, bar stock, pipes and extrusions along a storage plane. As its name indicates, the described cantilever rack system 500 is modular in nature as the number and configuration of the pre-holed supporting vertical members, the pair of rollout cantilever arms, horizontal bracing/support members, base members and other components may be adjusted according to material length, weight and material flexibility. The height of the vertical members as well the dimensions of the storage plane may also be adjusted accordingly.

According to a preferred embodiment, the integrated modularity of each element of the system 500 provides the flexibility to reconfigure and modify the modular cantilever rack system 500 as needed. Thus, the exemplary modular cantilever rack system 500 of FIG. 5 comprising only the minimum required components can easily be reconfigured into another example of a modular cantilever rack system 600 depicted on FIG. 6 comprising two pairs of pre-holed supporting vertical members 650 and a single vertical mechanical member 652 which further helps support the modular cantilever rack system 500.

Figure 6:
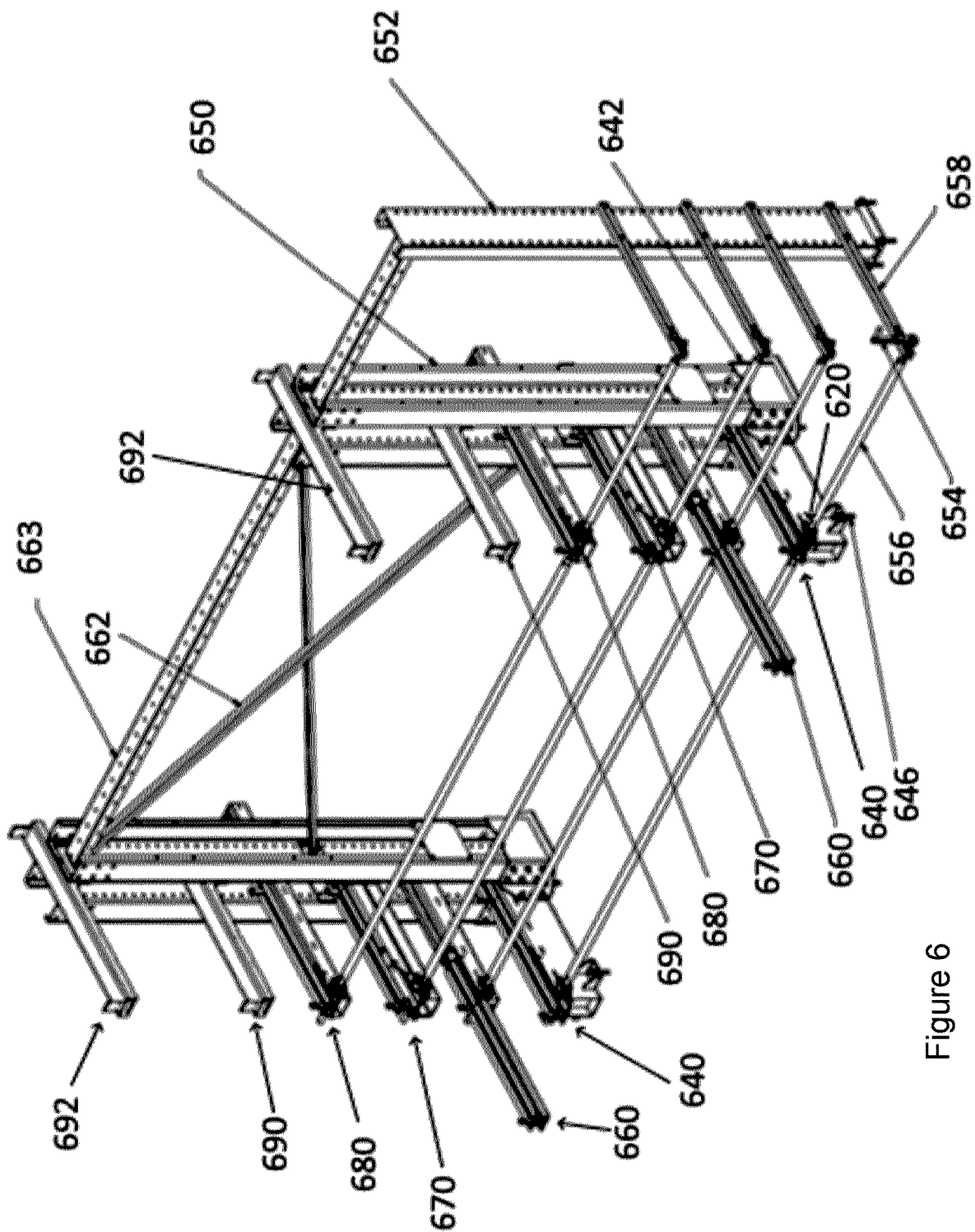
FIG. 6 is a perspective side view of a reconfigured modular cantilever rack system, according to a preferred embodiment.

The modular cantilever rack system 600 of FIG. 6 includes four pairs of rollout cantilever arms 640, 660, 670, 680 mechanically connected to a crank handle 654 via mechanical shafts 656. The mechanical shaft 656 interconnects the roller mechanism 620 to ensure synchronous rollout of the storage surface therebetween each of the rollout cantilever arm 640, 660, 670, 680. The mechanical shaft 656 is secured to the vertical mechanical member 652 via a mechanical arm 658 on which the crank handle 654 is secured. Other means may be used to mechanically engage the rollout cantilever arms. For example, instead of using a separate vertical member, a crank handle may be be directly secured onto the roller mechanism 620 or an electric motor may be coupled to the roller mechanism 620 to electrically power the roller mechanism via a power supply. Alternatively, the roller mechanism 620 may be directly engaged by a user without the need for a handle. Two diagonal bracing members 662 and a horizontal bracing member 663 are also provided to further support the loaded structure. The vertical members 650 are anchored to the ground using by a plurality of concrete anchors 646 inserted through the base members.

The modular cantilever rack system 600 as exemplified in FIG. 6 also comprises two pairs of static arms 690, 692 located above the rollout cantilever arms 640, 660, 670, 680 which cannot be extended. As such, lighter material that requires regular access would preferably be stored onto the lower rollout cantilever arms 640, 660, 670, 680 whereas material stored on the static arms may be accessed using an overhead crane or the like. The modularity of the modular cantilever rack system 600 allows a variety of rollout cantilever arms to be assembled within a single cantilever rack system according to the user's needs. Accordingly, each pair of rollout cantilever arms 640, 660, 670, 680 can be reconfigured to have different weight capacity. Various interconnecting elements may be added or removed. In addition, mounting plates (similar to element 472) secured to both the vertical members 650 and the rollout cantilever arms 660 may be provided to stabilize and support the system.

Figure 8A:
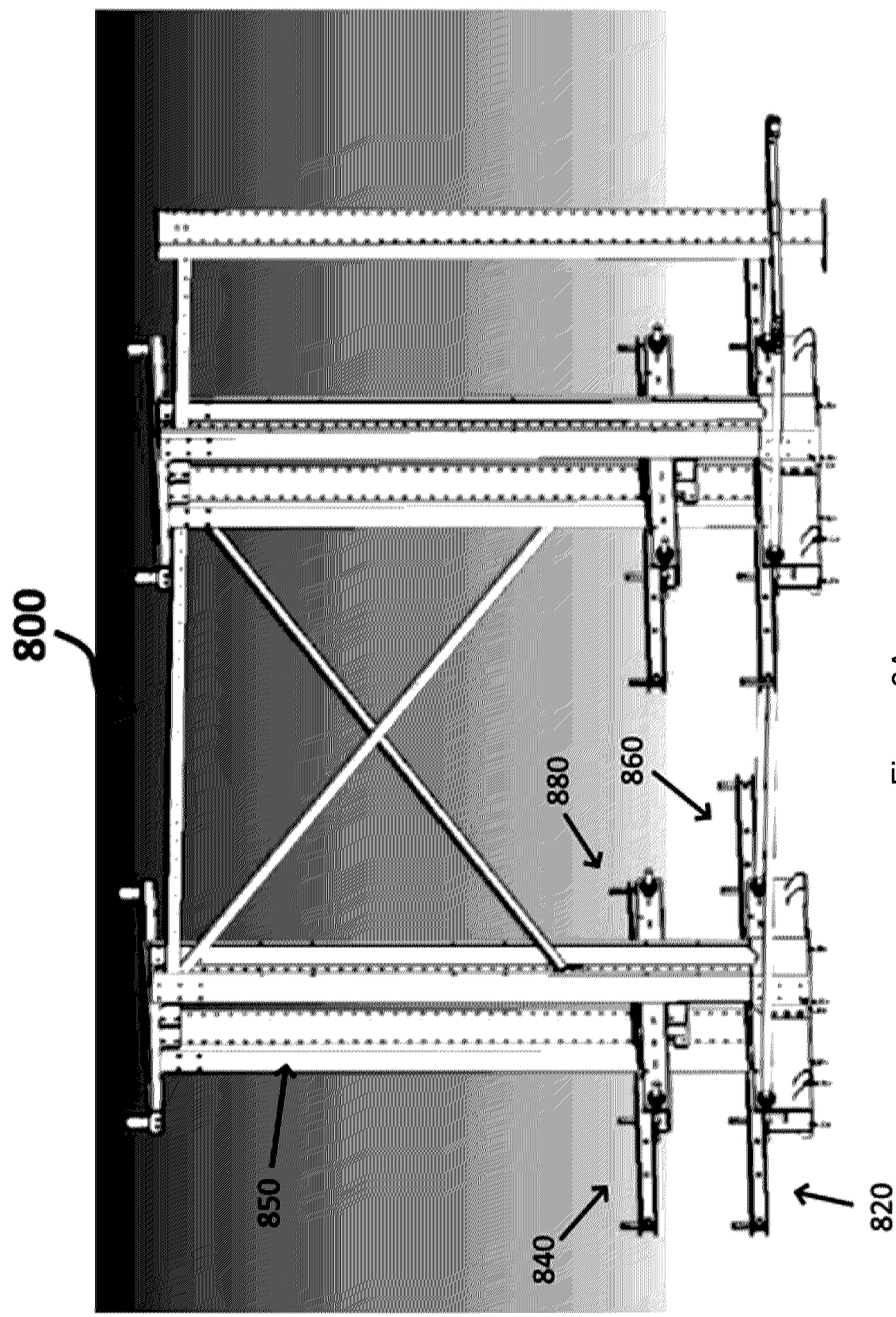
FIG. 8 is a perspective side view, top view, side view and front view, respectively, of a double-sided modular cantilever rack system, according to a preferred embodiment.
Figure 8B:
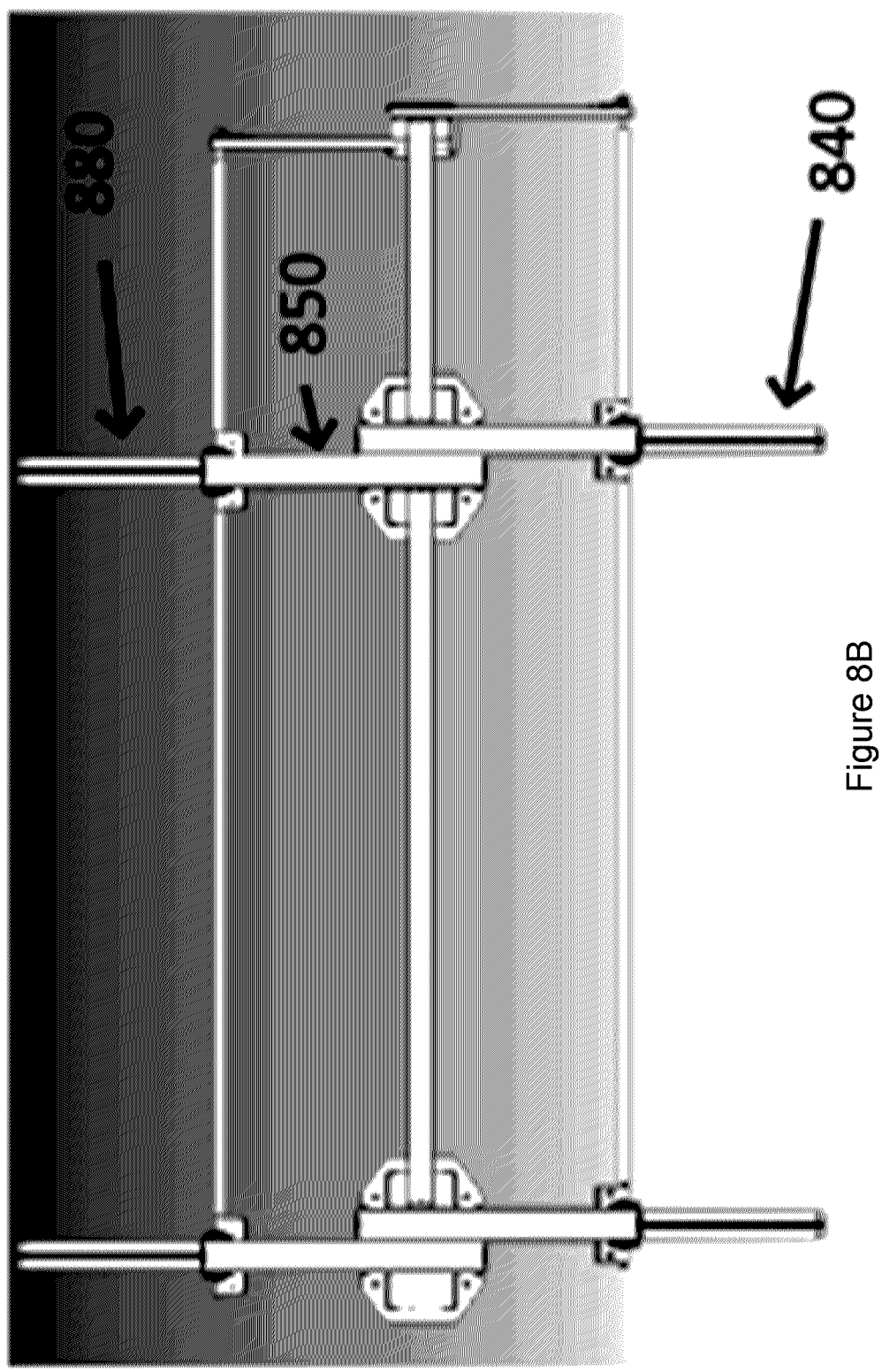
Figure 8C:
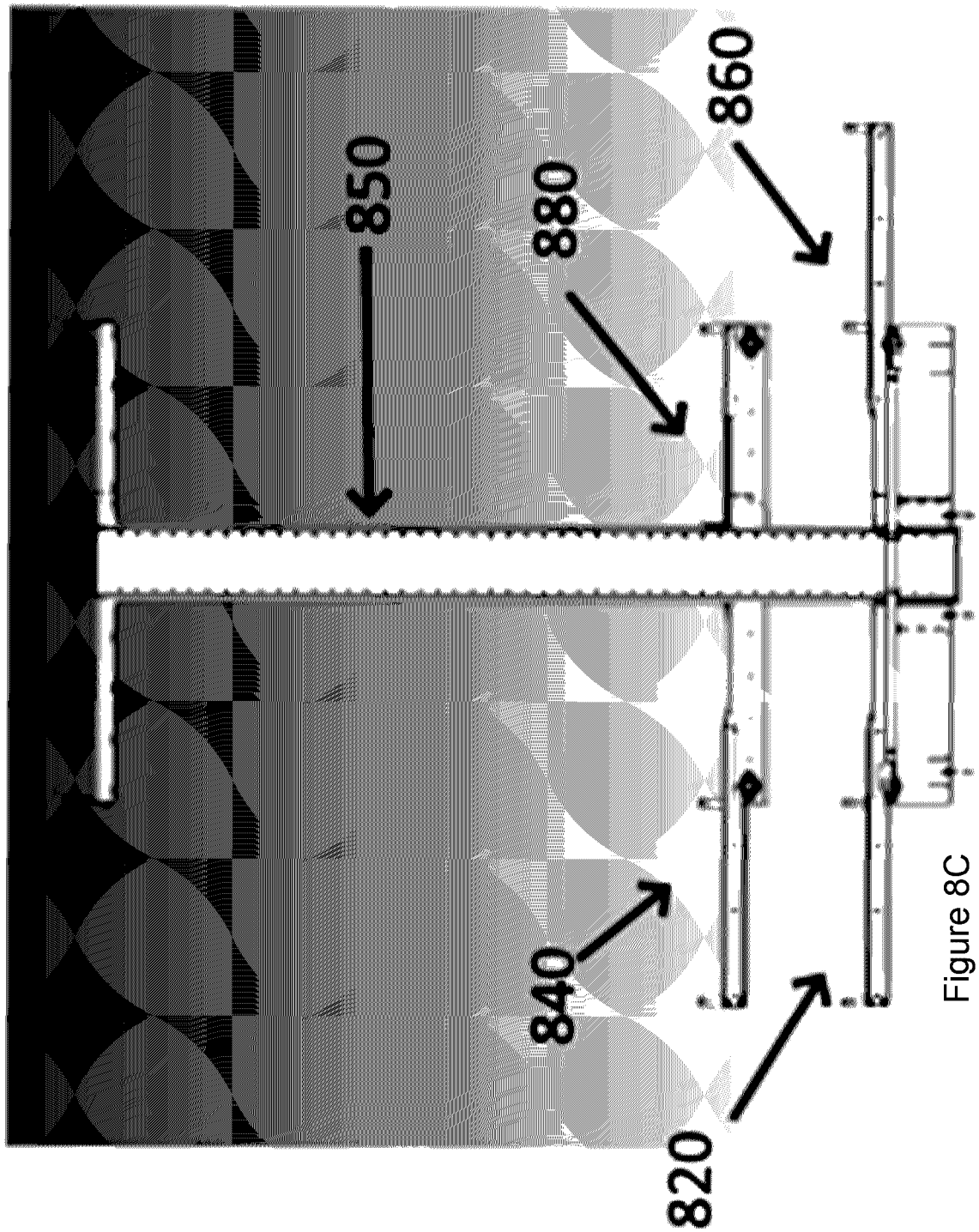

According to a preferred embodiment depicted in FIG. 8, the modular cantilever rack system 800 further comprises at least an opposite pair of rollout cantilever arms 880-840 and/or 820-860 secured to the respective pair of supporting vertical members 850, thereby defining a second mobile storage surface along the horizontal storage plane. The two-sided cantilever rack system 800 therefore comprises a pair of coplanar mobile storage surface defined by a first and second pair of rollout cantilever arms 820, 860; 840, 880. In a given pair of rollout cantilever arms 880-840, the interconnecting elements thereof are configured for securing the pair of rollout cantilever arms 880-840 together and for securing the pair of rollout cantilever arms 880-840 between the respective pair of supporting vertical members 850. The configuration of the interconnecting elements of the rollout cantilever arms 820, 860; 840, 880 is therefor adapted to be compatible with one another when oppositely positioned as well as to be compatible with the pre-holed pattern of the supporting vertical members 850. Additional interconnecting plates may also be provided with a width corresponding to one of the rollout cantilever arms 820, 860; 840, 880 or a width corresponding to a pair of the rollout cantilever arms 880-840, 820-860. When the width of the additional interconnecting plates corresponds to one of the rollout cantilever arms, it may be configured to be reversible, allowing two identical interconnecting elements secured to one another to be used between the supporting vertical members 850, respecting the pre-holed pattern thereof. Furthermore, the additional interconnecting plates may also be made reversible such that that may be used above and below the pair of the rollout cantilever arms 880-840, 820-860 for further increasing the load capacity.

According to another embodiment, the cantilever arms described herein may be combined with a pallet rack, thereby providing a hybrid modular cantilever rack system comprising cantilever arms and pallets for storing sheet materials.

Figure 7:
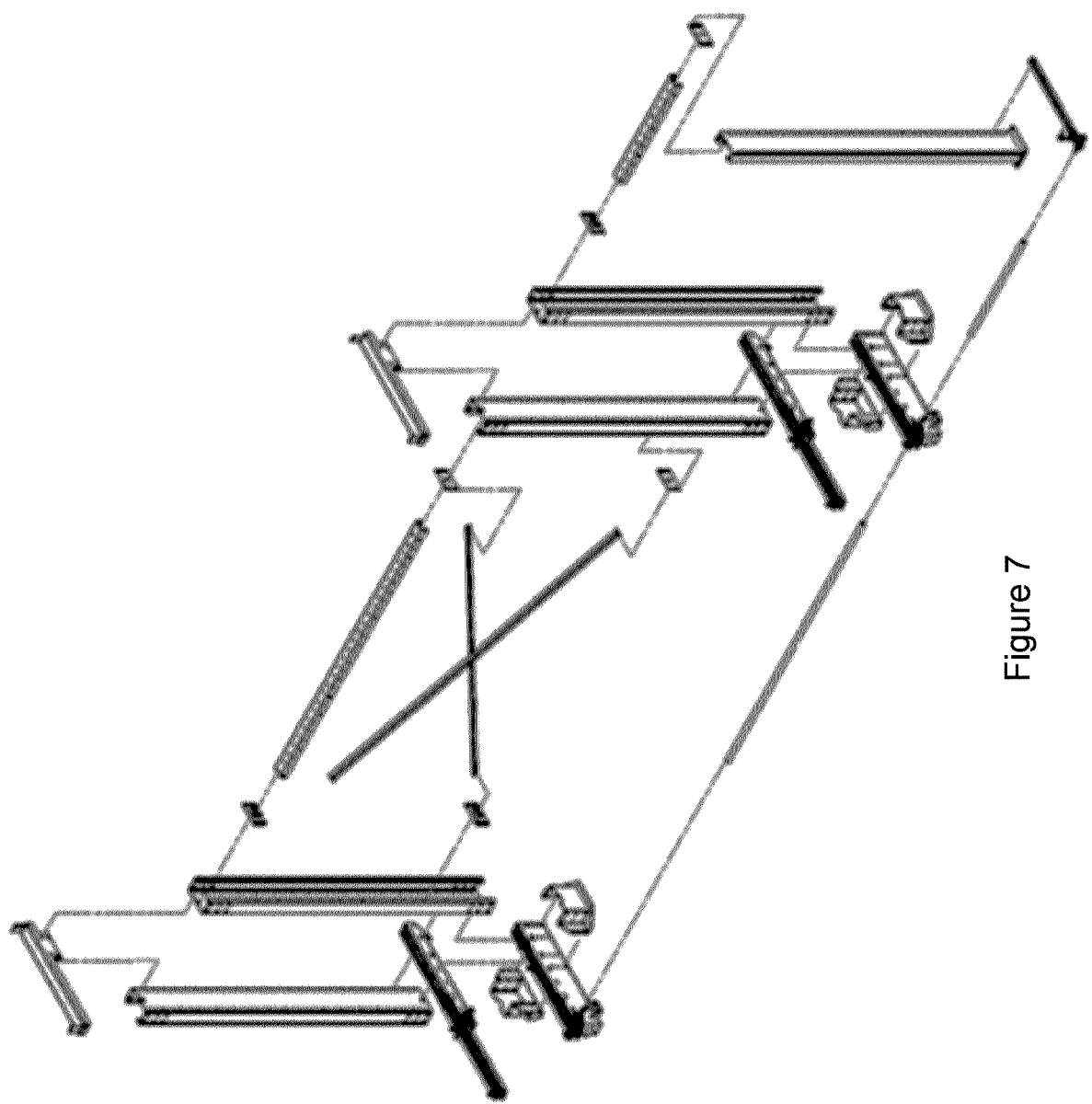
FIG. 7 is a perspective side view of the individual components of a modular cantilever rack system, according to a preferred embodiment.
Figure 9:
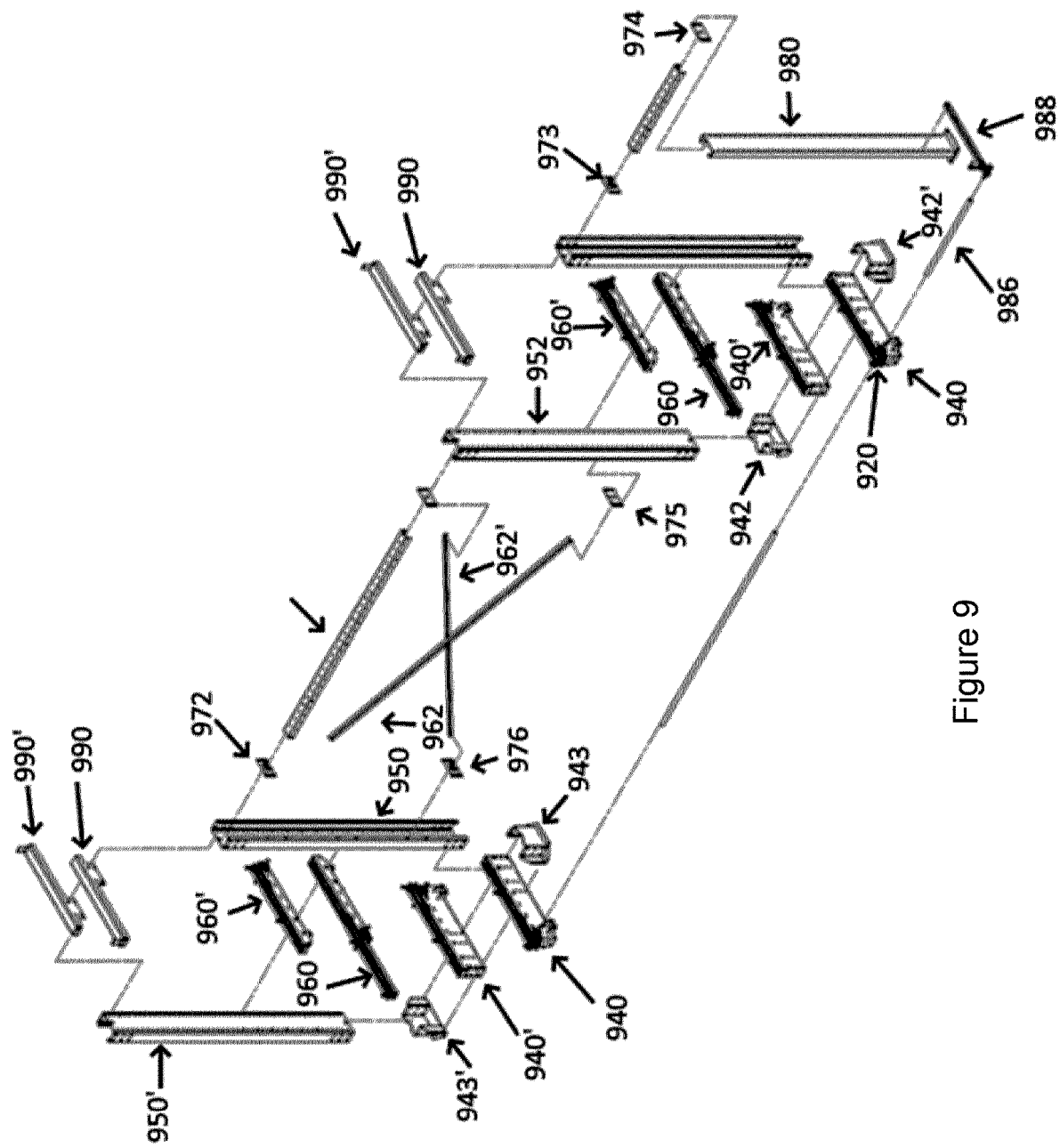
FIG. 9 is a perspective side view of the individual components of a double-sided modular cantilever rack system, according to a preferred embodiment.
Figure 10:
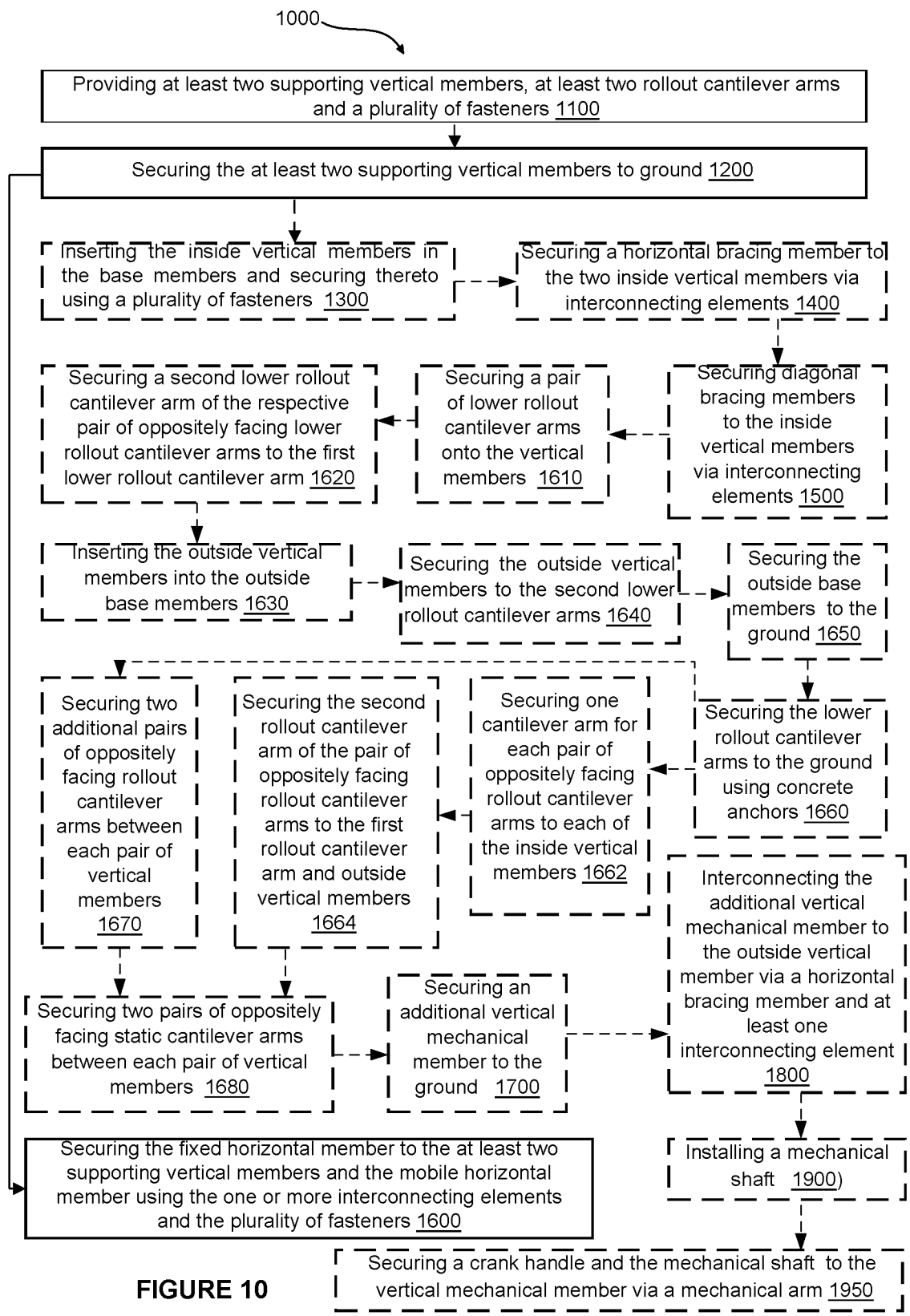
FIG. 10 is a flow chart of a method of assembling a modular cantilever rack system, according to a preferred embodiment.

In order to illustrate the modularity of a modular cantilever rack system, a method 900; 1000 of assembling a double-sided modular cantilever rack system is described herein with particular reference to FIGS. 9 and 10. Dotted assembly lines are shown for depicting the connection between each element in accordance with the method 900 of assembly. A method 700 of assembling a single-sided modular cantilever rack system is depicted with particular reference to FIG. 7. Dotted assembly lines are shown for depicting the connection between each element in accordance with the method 700, 900, 1000 of assembly.

According to a preferred embodiment, the method 900; 1000 includes providing 1100 at least two supporting vertical members 950, 950'; 952, 952', at least a pair of rollout cantilever arms 940, 940'; 960, 960' and a plurality of fasteners (not shown) 1100. In the exemplary embodiment depicted in FIG. 9, two pairs of vertical members 950, 950'; 952, 952' and two pairs of rollout cantilever arms 940, 960 oppositely facing two pairs of rollout cantilever arms 940', 960' are provided. The exemplary embodiment of FIG. 9 comprises two pairs of base members 942, 942'; 943, 943' wherein inside base members 942, 943 are first secured 1200 to the ground using a plurality of anchors (e.g., concrete anchors when on concrete floor). The inside vertical members 950, 950' are then inserted 1300 in the base members 942, 943 and secured thereto using a plurality of fasteners (e.g., #5 bolts and lock nuts). Still in the exemplary embodiment of FIG. 9, a horizontal bracing member 940 is secured 1400 to the two inside vertical members 950, 952 via interconnecting elements. Other means of bracing well known in the art may be used instead of the horizontal bracing without deviating from the present teachings. For example, diagonal bracing members (not shown) secured to the outside vertical members 950', 952' and the ground may be added instead of, or in addition to, the horizontal bracing member 940. In the depicted embodiment, two diagonal bracing members 962, 962' are secured 1500 to the inside vertical members 950, 952 via interconnecting elements.

The method 900 as exemplified in FIG. 9 continues with the assembly of the pairs of oppositely facing rollout cantilever arms 940, 940'; 960, 960'. The pair of lower rollout cantilever arms 940, 940' are first mounted 1610 onto the vertical members as they function as additional support for the structure. It is to be understood that the modularity of the system allows for other means well known the art for stabilizing the structure to the ground instead of the lower rollout cantilever arms 940, 940'; 960, 960' depicted in FIG. 9. As such, other cantilever arm variations such as 960, 960' may be be mounted at a ground level without compromising the stability of the system. A first lower rollout cantilever arm for each pair of oppositely facing lower rollout cantilever arms 940, 940' is first secured 1610 to each of the inside vertical members 950, 950'. The second lower rollout cantilever arm of the respective pair of oppositely facing lower rollout cantilever arms 940, 940' is then secured 1620 to the first lower rollout cantilever arm. The outside vertical members 950', 952' are then inserted 1630 into the outside base members 942', 943' which are then secured 1640 to the second lower rollout cantilever arms 940, 940'. The outside base members 942', 943' are secured 1650 to the ground at a distance generally equal to double the width of the rollout cantilever arms so as to mount two oppositely facing cantilever arms between each of the outside and inside vertical members. The lower rollout cantilever arms 940, 940'; 960, 960' are then secured 1660 to the ground using concrete anchors (not shown). Still in the exemplary embodiment, two additional pairs of oppositely facing rollout cantilever arms 960, 960' are mounted 1670 between each pair of vertical members 950, 950'; 952, 952' by securing 1662 one cantilever arm for each pair of oppositely facing rollout cantilever arms 960, 960' to each of the inside vertical members 950, 952, followed by the second rollout cantilever arm of the pair of oppositely facing rollout cantilever arms 940, 940' being secured 1664 to the first rollout cantilever arm and outside vertical members 950', 952'. The two pairs of oppositely facing static cantilever arms 990, 990' are similarly mounted 1680.

As exemplified in FIG. 9, an additional vertical mechanical member 980 is secured 1700 to the ground and interconnected 1800 to the outside vertical member 952' via a horizontal bracing member 982 and at least one interconnecting. Still in the exemplary embodiment of FIG. 9, a mechanical shaft 986 interconnecting the roller mechanism 920 of each of the rollout cantilever arm 940, 940'; 960, 960' to a crank handle 984 is installed 1900 for extending and retracting the rollout cantilever arms 940, 940'; 960, 960'. According to the illustrative embodiment of FIG. 9, the crank handle 984 and mechanical shaft 986 are secured 1950 to the vertical mechanical member 980 via a mechanical arm 988.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A rollout cantilever arm for a modular cantilever rack system comprising:
   a fixed horizontal member comprising two oppositely facing fixed parallel load-bearing surfaces, a roller mechanism and one or more interconnecting elements; and
   a mobile horizontal member partially encased in the fixed horizontal member comprising a roller-end engaged between the two load-bearing surfaces and a load-bearing surface supported by the roller mechanism;
   wherein the interconnecting elements of the fixed horizontal member are configured for interconnecting two supporting vertical members of the modular cantilever rack system, the load-bearing surfaces extending perpendicularly between the two vertical members and the roller mechanism being located at an end distant from the two vertical members.

2. The rollout cantilever arm of claim 1, further comprising material stoppers for retaining long material on the rollout cantilever arm.

3. A modular cantilever rack system comprising at least a pair of pre-holed supporting vertical members, at least a pair of rollout cantilever arms, each of said rollout cantilever arms comprising:
   a fixed horizontal member comprising two oppositely facing fixed parallel load-bearing surfaces, a roller mechanism and one or more interconnecting elements; and
   a mobile horizontal member partially encased in the fixed horizontal member comprising a roller-end engaged between the two load-bearing surfaces and a load-bearing surface supported by the roller mechanism;
   wherein the interconnecting elements of the fixed horizontal member are configured for interconnecting two supporting vertical members of the modular cantilever rack system, the load-bearing surfaces extending perpendicularly between the two vertical members and the roller mechanism being located at an end distant from the two vertical members; and
   a plurality of fasteners for securing respective ones of the one or more interconnecting elements from the pair of rollout cantilever arms to respective ones of the pair of supporting vertical members thereby defining a first mobile storage surface along a horizontal storage plane.

4. The modular cantilever rack system of claim 3, further comprising at least an opposite pair of said rollout cantilever arms, secured with the pair of rollout cantilever arms to the respective ones of the pair of supporting vertical members thereby defining a second mobile storage surface along the horizontal storage plane.

5. The modular cantilever rack system according to claim 4, further comprising base members secured to the vertical members for supporting the vertical members into ground.

6. The modular cantilever rack system according to claim 3, further comprising base members secured to the vertical members for supporting the vertical members into ground.

7. The modular cantilever rack system according to claim 3, further comprising anchors for securing the vertical members into ground.

8. The modular cantilever rack system according to claim 7, for storing long material.

9. The modular cantilever rack system according to claim 8, wherein said long material comprises metal tubing, bar stock, pipes and extrusions along the horizontal storage plane.

10. The modular cantilever rack system according to claim 3, further comprising at least one bracing member secured to the support columns for stabilizing the support columns.

11. A method comprising:
    providing the modular cantilever rack system of claim 3,
    providing at least two of said supporting vertical members, at least two of said rollout cantilever arms and the plurality of fasteners,
    securing the at least two supporting vertical members to ground, and
    securing the fixed horizontal member to the at least two supporting vertical members and the mobile horizontal member using the one or more interconnecting elements and the plurality of fasteners.

* * * * *